United States Patent
Ingermanson et al.

(10) Patent No.: US 8,107,711 B2
(45) Date of Patent: Jan. 31, 2012

(54) USER INTERFACE METHOD AND SYSTEM FOR MANAGEMENT AND CONTROL OF AUTOMATED IMAGE PROCESSING IN HIGH CONTENT SCREENING OR HIGH THROUGHPUT SCREENING

(75) Inventors: Randall S. Ingermanson, Battleground, WA (US); Jeffrey M. Hilton, San Diego, CA (US)

(73) Assignee: Vala Sciences, Inc., San Diego, CA (US)

( * ) Notice: Subject to any disclaimer, the term of this patent is extended or adjusted under 35 U.S.C. 154(b) by 428 days.

(21) Appl. No.: 12/454,081

(22) Filed: May 12, 2009

(65) Prior Publication Data
US 2010/0061617 A1    Mar. 11, 2010

Related U.S. Application Data

(60) Provisional application No. 61/127,412, filed on May 12, 2008.

(51) Int. Cl.
*G06K 9/00* (2006.01)
(52) U.S. Cl. ....................................................... 382/133
(58) Field of Classification Search ........... 382/128–134
See application file for complete search history.

(56) References Cited

U.S. PATENT DOCUMENTS

2010/0027071 A1* 2/2010 Schindler et al. ............ 358/1.18
* cited by examiner

*Primary Examiner* — David Mis
(74) *Attorney, Agent, or Firm* — INCAPLAW; Terrance A. Meador

(57) ABSTRACT

A user interface method and system for controlling automated image processing operations of HCS and/or HTS systems includes a graphical interface to enable user designation of an image naming convention, image sources and destinations, image processing channels, processing parameter values, and processing spatial designations.

16 Claims, 13 Drawing Sheets

FIG. 5

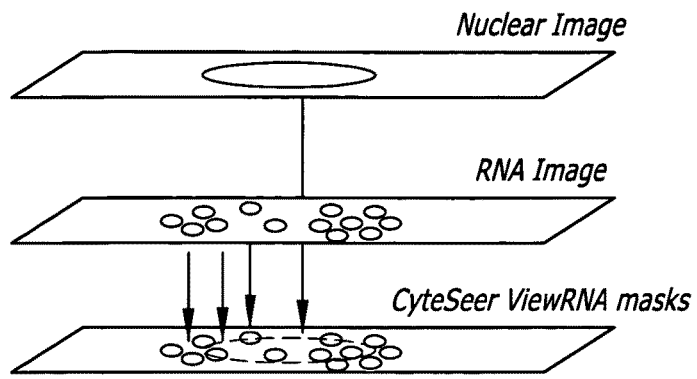
FIG. 6
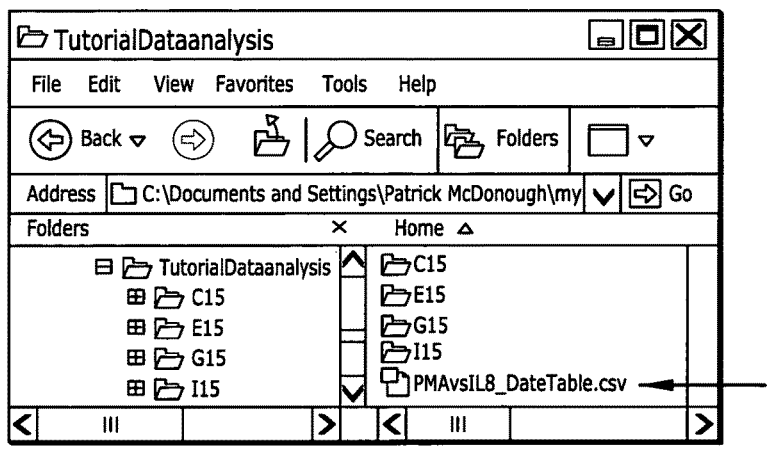
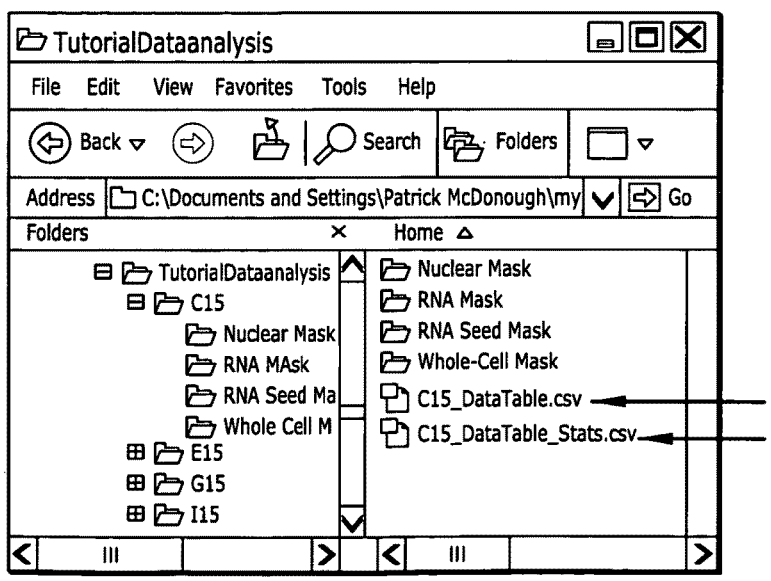
FIG. 7

| | A | B | C | D | E | F | G | H | |
|---|---|---|---|---|---|---|---|---|---|
| 1 | DataTable: | C15 Data Table | | | | | | | |
| 2 | Description: | DataTable for cells in will C15 | | | | | | | |
| 3 | | | | | | | | | |
| 4 | | | | | | | | | |
| 5 | Legend: | | | | | | | | |
| 6 | | | | | | | | | |
| 7 | integer | id | ID of each record | | | | | | |
| 8 | double | Area Nm | Area of Nuclear Mask | | | | | | |
| 9 | double | Area Rm | Area of RNA Mask | | | | | | ⎫ RNA data |
| 10 | integer | XLeft Nm | XLeft of Nuclear Mask | | | | | | |
| 11 | integer | YTop Nm | YTop of Nuclear Mask | | | | | | |
| 12 | integer | Width Nm | Width of Nuclear Mask | | | | | | ⎬ Location data |
| 13 | integer | Height Nm | Height of Nuclear Mask | | | | | | |
| 14 | boolean | IsBoundary Nm | IsBoundary of Nuclear Mask | | | | | | |
| 15 | double | XCentroid Nm | XCentroid of Nuclear Mask | | | | | | |
| 16 | double | YCentroid Nm | YCentroid of Nuclear Mask | | | | | | |
| 17 | double | RNA Spot Count | RNA Spot Count | | | | | | |
| 18 | double | Mean RNA Spot Area | Mean RNA Spot Area | | | | | | ⎬ RNA data |
| 19 | double | RMS RNA spot Diameter | RMS RNA Spot Diameter | | | | | | |
| 20 | double | Area X Nm | Area of No-RNA Nucleous Mask | | | | | | ⎫ Background data |
| 21 | double | Area X Cm | Area of No-RNA Cytoplasm Mask | | | | | | |
| 22 | double | TTI Ri Rm | Total Integrated Intensity of RNA Image on RNA Mask | | | | | | |
| 23 | double | API Ri Rm | Average Pixel Intensity of RNA Image onRNA Mask | | | | | | |
| 24 | double | MPI Ri Rm | Median Pixel Intensity of RNA Image on RNA Mask | | | | | | ⎬ RNA data |
| 25 | double | SPI Ri Rm | Standard Deviation of Pixel Intensity of RNA Image on RNA Mask | | | | | | |
| 26 | double | TTI Ri Rm | Total Integrated Intensity of RNA Iamge on No-RNA Nucleus Mask | | | | | | |
| 27 | double | API Ri X Nm | Average Pixel Intensity of RNA Image on No-RNA Nucleus Mask | | | | | | |
| 28 | double | MPI Ri X Nm | Median Pixel Intensity of RNA Image on No-RNA Nucleus Mask | | | | | | |
| 29 | double | SPI Ri X Nm | Standard Deviation of Pixel Intensity of RNA Image on No-RNA Cytoplasm Mask | | | | | | ⎬ Background data |
| 30 | double | TTI Ri X Cm | Total Integrated Intensity of RNA Image on No-RNA Cytoplasm Mask | | | | | | |
| 31 | double | API Ri X Cm | Average Pixel Intensity of RNA Image on No-RNA Cytoplasm Mask | | | | | | |
| 32 | double | MPI Ri X Cm | Medium Pixel Intensity of RNA Image on No-RNA Cytoplasm Mask | | | | | | |
| 33 | double | SPI Ri X Cm | Standard Deviation of Pixel Intensity of RNA Image on No-RNA Cytoplasm Mask | | | | | | |

FIG. 8

*C15 Negative Control*

| | A | B | C | D | E | F | G | H | I | J | K | L | M |
|---|---|---|---|---|---|---|---|---|---|---|---|---|---|
| | id | Area Nm | Area Rm | XLeft NM | YTop NM | Width Nm | Height Nm | IsBoundar | XCentr | YCentr | RNA Spot Count | Mean RNA Spot Area | RMS RNA Spot Diameter |
| 37 | 1 | 1291 | 0 | 114 | 0 | 76 | 23 | TRUE | 149.84 | 8.812 | 0 | 0 | 0 |
| 38 | 2 | 1279 | 0 | 887 | 0 | 50 | 31 | TRUE | 911.27 | 13.25 | 0 | 0 | 0 |
| 39 | 3 | 2118 | 0 | 995 | 21 | 47 | 56 | FALSE | 1019.2 | 49.19 | 0 | 0 | 0 |
| 40 | 4 | 3688 | 0 | 689 | 19 | 72 | 95 | FALSE | 674.49 | 62.7 | 0 | 0 | 0 |
| 41 | 5 | 1963 | 0 | 918 | 56 | 53 | 49 | FALSE | 943.77 | 80.62 | 0 | 0 | 0 |
| 42 | 6 | 3646 | 0 | 30 | 113 | 72 | 71 | FALSE | 67.86 | 144.9 | 0 | 0 | 0 |
| 43 | 7 | 3201 | 0 | 966 | 109 | 85 | 57 | FALSE | 1009.1 | 140.7 | 0 | 0 | 0 |
| 44 | 8 | 2746 | 0 | 1668 | 122 | 63 | 58 | FALSE | 1696.3 | 147.3 | 0 | 0 | 0 |
| 45 | 9 | 3436 | 0 | 228 | 122 | 79 | 69 | FALSE | 266.76 | 155 | 0 | 0 | 0 |
| 46 | 10 | 1964 | 0 | 1341 | 131 | 55 | 45 | FALSE | 1365.9 | 152.6 | 0 | 0 | 0 |

*G15 Positive Control*

| | A | B | C | D | E | F | G | H | I | J | K | L | M |
|---|---|---|---|---|---|---|---|---|---|---|---|---|---|
| | id | Area Nm | Area Rm | XLeft NM | YTop NM | Width Nm | Height Nm | IsBoundar | XCentr | YCentr | RNA Spot Count | Mean RNA Spot Area | RMS RNA Spot Diameter |
| 37 | 1 | 2369 | 1316 | 770 | 0 | 60 | 53 | TRUE | 799.63 | 20.693 | 60 | 21.93333333 | 5.284542303 |
| 38 | 2 | 281 | 53 | 1576 | 0 | 36 | 10 | TRUE | 1595.4 | 3.6263 | 3 | 11 | 3.742410319 |
| 39 | 3 | 2839 | 690 | 1038 | 0 | 81 | 59 | TRUE | 10.76 | 26.628 | 55 | 12.65154545 | 4.01400993 |
| 40 | 4 | 2682 | 345 | 276 | 15 | 68 | 59 | TRUE | 312.4 | 27.214 | 28 | 12.32142857 | 3.960824422 |
| 41 | 5 | 2377 | 709 | 1437 | 22 | 69 | 50 | FALSE | 1471.3 | 39.355 | 59 | 12.01694915 | 3.911579587 |
| 42 | 6 | 3076 | 45 | 27 | 17 | 82 | 89 | FALSE | 70.788 | 46.776 | 5 | 9 | 3.385137501 |
| 43 | 7 | 3949 | 2498 | 1322 | 65 | 85 | 79 | FALSE | 1370.5 | 64.171 | 124 | 12.08064516 | 3.921932578 |
| 44 | 8 | 4514 | 2106 | 519 | 50 | 84 | 75 | FALSE | 556.67 | 202.85 | 148 | 14.22972973 | 4.256507324 |
| 45 | 9 | 2400 | 990 | 545 | 50 | 56 | 74 | FALSE | 868.55 | 92.588 | 81 | 12.22222222 | 3.944846848 |
| 46 | 10 | 3239 | 794 | 397 | 64 | 54 | 74 | FALSE | 423.34 | 105.31 | 70 | 11.41428571 | 3.812232934 |
| 47 | 11 | 3491 | 2032 | 247 | 100 | 84 | 59 | FALSE | 289.31 | 130.43 | 112 | 18.14285714 | 4.806267072 |

*FIG. 10*

C15_DataTable_States.csv

| | A | B | C | D | E | M | N | O | R | S | T | U |
|---|---|---|---|---|---|---|---|---|---|---|---|---|
| 38 | id | Well | Statistic | Area Rm | Area Nm | RNA Spot Count | Mean RNA Spot Area | RMS RNA Spot Diameter | TII Ru RM | API Ru Rm | MPI Ru RM | TII Ru RM |
| 39 | 1 | C15 | Count | 142 | 142 | 142 | 142 | 142 | 142 | 142 | 142 | 142 |
| 40 | 2 | C15 | Mean | 2952.03 | 0.39437 | 0.035211268 | 0.253521127 | 0.0953559863 | 3.27464789 | 1.6928795 | 1.6619718 | 0.136892 |
| 41 | 3 | C15 | Sigma | 1007.16 | 3.98413 | 0.219952644 | 1.494370617 | 0.365072234 | 12.8366238 | 3.8624109 | 5.8295984 | 1.541695 |
| 42 | 4 | C15 | Median | 2853 | 0 | 0 | 0 | 0 | 0 | 0 | 0 | 0 |
| 43 | 5 | C15 | Min | 599 | 0 | 0 | 0 | 0 | 0 | 0 | 0 | 0 |
| 44 | 6 | C15 | Max | 6287 | 18 | 2 | 9 | 3.385137501 | 99 | 31 | 31 | 18.36059 |
| 45 | | | | | | | | | | | | |

PMAvsIL8_DataTable

*FIG. 11-1*

PMAvsIL8_DataTable_Stats.cs

☐ C15_DataTable.csv

| | A | B | C | E | M | N | O | R | S | T | U |
|---|---|---|---|---|---|---|---|---|---|---|---|
| 38 | id | Well | Statistic | Area Rm | RNA Spot Count | Mean RNA Spot Area | RMS RNA Spot Diameter | TII Ru RM | API Ru RM | MPI Ru RM | TII Ru RM |
| 39 | 1 | C15 | Count | 142 | 142 | 142 | 142 | 142 | 142 | 142 | 142 |
| 40 | 2 | C15 | Mean | 0.394366 | 0.035211268 | 0.253521127 | 0.095355986 | 3.27464789 | 1.6928795 | 1.6619718 | 0.136892 |
| 41 | 3 | C15 | Sigma | 1.989183 | 0.219952644 | 1.494370617 | 0.365072234 | 12.8366238 | 3.8624109 | 5.8295984 | 1.541695 |
| 42 | 4 | C15 | Median | 0 | 0 | 0 | 0 | 0 | 0 | 0 | 0 |
| 43 | 5 | C15 | Min | 0 | 0 | 0 | 0 | 0 | 0 | 0 | 0 |
| 44 | 6 | C15 | Max | 18 | 2 | 9 | 3.385137501 | 99 | 31 | 31 | 18.36059 |
| 45 | 7 | E15 | Count | 127 | 127 | 127 | 127 | 127 | 127 | 127 | 127 |
| 46 | 8 | E15 | Mean | 189.6504 | 14.30656934 | 9.419992813 | 3.198814404 | 3684.85401 | 9.6094577 | 8.6423358 | 4.612812 |
| 47 | 9 | E15 | Sigma | 309.9221 | 16.46366858 | 4.802399023 | 1.332063304 | 10029.1111 | 7.4409494 | 7.1975662 | 3.688626 |
| 48 | 10 | E15 | Median | 81 | 8 | 9.25 | 3.431831259 | 334 | 7.9936508 | 7 | 3.730312 |
| 49 | 11 | E15 | Min | 0 | 0 | 0 | 0 | 0 | 0 | 0 | 0 |
| 50 | 12 | E15 | Max | 2328 | 84 | 29.84615385 | 6.164519717 | 88081 | 37.635481 | 36 | 17.73001 |
| 51 | 13 | G15 | Count | 136 | 136 | 136 | 136 | 136 | 136 | 136 | 136 |
| 52 | 14 | G15 | Mean | 1185.279 | 84.06617647 | 13.62813169 | 4.138045272 | 27200.4118 | 20.252521 | 19.264706 | 9.391973 |
| 53 | 15 | G15 | Sigma | 744.83 | 43.60551291 | 3.41016548 | 0.479739289 | 23468.8662 | 6.6701029 | 7.0071237 | 2.895288 |
| 54 | 16 | G15 | Median | 1005 | 78 | 12.52222222 | 3.992967383 | 22327 | 20.255481 | 18 | 9.859276 |
| 55 | 17 | G15 | Min | 33 | 3 | 9 | 3.385137501 | 180 | 4 | 4 | 1.115547 |
| 56 | 18 | G15 | Max | 5270 | 358 | 35.01515152 | 6.677025953 | 138054 | 35.423978 | 33 | 20.49108 |
| 57 | 19 | I15 | Count | 100 | 100 | 100 | 100 | 100 | 100 | 100 | 100 |
| 58 | 20 | I15 | Mean | 1105.32 | 68.46 | 14.70523068 | 4.255027925 | 30405.07 | 22.134388 | 20.76 | 10.16538 |
| 59 | 21 | I15 | Sigma | 898.3709 | 41.02190102 | 4.95528446 | 0.790047605 | 33681.4218 | 8.3580325 | 5.292774 | 3.230186 |
| 60 | 22 | I15 | Medium | 854 | 57 | 13.54545455 | 4.154296966 | 17395 | 21.228182 | 20 | 10.25521 |
| 61 | 23 | I15 | Min | 0 | 0 | 0 | 0 | 0 | 0 | 0 | 0 |
| 62 | 24 | I15 | Max | 4220 | 215 | 29.88679245 | 6.168715103 | 153298 | 40.035663 | 36 | 16.09406 |
| 63 | | | | | | | | | | | |

A01_DataTable

USER INTERFACE METHOD AND SYSTEM FOR MANAGEMENT AND CONTROL OF AUTOMATED IMAGE PROCESSING IN HIGH CONTENT SCREENING OR HIGH THROUGHPUT SCREENING

PRIORITY

This application claims priority to U.S. Provisional Application for Patent 61/127,412, filed May 12, 2008.

RELATED APPLICATIONS

The following patent applications contain subject matter related to this application. Both applications are incorporated herein by this reference.

U.S. patent application Ser. No. 11/285,691, filed Nov. 21, 2005 for "System, Method, And Kit For Processing A Magnified Image Of Biological Material To Identify Components Of A Biological Object", published as US 2008/0144895 on Jun. 19, 2008; and, PCT application PCT/US2006/044936, filed Nov. 17, 2005 for "System, Method, And Kit For Processing A Magnified Image Of Biological Material To Identify Components Of A Biological Object", published as WO 2007/061971 on May 31, 2007.

STATEMENT OF GOVERNMENT INTEREST

The invention described herein were made in part with government support under Grant No. 1R43DK074333-01, Grant No. 1R41DK076510-01, and Grant No. 1R42HL086076, all awarded by the National Institutes of Health. The United States Government has certain rights in the invention.

BACKGROUND

The technical field concerns high content screening (HCS) and/or high throughput screening (HTS) using an automated image processing system having the capability to detect and measure one or more components of one or more objects in magnified images of biological material.

In HCS and/or HTS, an automated image processing system obtains magnified images from an automated microscope and subjects those images to processing methods that are specially designed to detect and measure small components of biological material. The processing methods employ algorithms customized to respond to markings, such as colors, and to detect particular image characteristics, such as shapes, so as to quickly and reliably identify components or features of interest. Based upon the identification, the system then makes spatial and quantitative measurements useful in analysis of experimental results. Automated image processing systems are increasingly used as assay tools to determine, measure, and analyze the results of tests directed to development or evaluation of drugs and biological agents.

The related applications describe an automated image processing system that distinguishes densely packed shapes in cellular and sub-cellular structures that have been activated in some way. The system identifies components such as membranes, nuclei, lipid droplets, molecules, and so on, using image processing algorithms that are customized to detect the shapes or other visible features of such components.

Presently, HCS and/or HTS systems quickly acquire and process large numbers of microscopic images and produce significant quantities of information. Substantial attention and time are required from a user to efficiently manage and accurately control the system operations including automated image processing, image data management, and image data analysis. Consequently, there is a need to provide tools that enhance user efficiency and convenience, while reducing the time spent and errors encountered in controlling operations of HCS and/or HTS systems.

SUMMARY

A user interface method and system for controlling automated image processing, image data management, and image data analysis operations of HCS and/or HTS systems include a graphical user interface ("GUI") to enable user designation of an image naming convention, image sources and destinations, image processing channels, processing parameter values, and processing spatial designations.

BRIEF DESCRIPTION OF THE DRAWINGS

FIG. 5 illustrates the graphical user interface screen of FIG. 4 following selection of an image naming convention.

FIG. 6 illustrates an image process performed by an automated image processing system to generate a mask from an acquired image.

FIG. 7 illustrates data files used to manage experimental data produced by an automated image processing system.

FIG. 8 illustrates a data table format used to store experimental data produced by an automated image processing system.

FIG. 10 illustrates two additional data table formats used to store experimental data produced by an automated image processing system.

DETAILED DESCRIPTION OF THE PREFERRED EMBODIMENTS

As will be evident, it is desirable to apply the principles of this description broadly to control of image processing algorithms tailored to many and varied analysis tasks in processing systems that process image data to analyze, screen, identify, and/or classify image features, objects, and/or contents. It is particularly desirable to afford a user the ability to prepare image data for processing, to selectively control modes and parameters of processing the image data, to view results produced by processing the image data, and to selectively step through successive cycles of image data processing in order to adjust results.

In this description, a specific biological process—transcription—is used to illustrate a user interface method and system for automated image processing in HCS or HTS. The example is intended to illustrate how a user can manage and control execution of an image processing algorithm selected to process magnified images of biological material in order to analyze features of the material affected by a biological assay. This example is not intended to limit the application of the principles of the user method and system only to a particular type of image.

Gene expression begins with transcription, the process by which messenger RNAs are transcribed from the genome. In transcription, messenger RNA (mRNA) is synthesized in a cell under control of DNA. The process copies a DNA sequence into a cell using mRNA. The copied sequence is in fact a strand of RNA in the cell. The number of mRNA copies present in a cell transcribed from a single gene can vary from 0 to >1000, as transcription is heavily regulated during cell differentiation or responses of the cells to hormones, drugs, or disease states.

Through use of inexpensive reagents and simple protocols a transcription assay can be conducted in which mRNA is synthesized and then captured. The location and number of individual mRNA species captured can be visualized in cells and tissue sections by fluorescence-based detection and quantified by automated image processing.

For visualization in images, a probe is used which binds to target mRNA species with very high specificity. It is possible to generate probes to virtually any known sequence. Preferably, such probes are hybridized to the target mRNAs in cell or tissue samples that have been fixed and permeabilized. A fluorescent reagent may then added, which binds to the probe. When slides and well plates containing cultured cells are processed in this manner, and viewed with fluorescence microscopy, bright spots (mRNA loci) are apparent that correspond to individual copies of the target mRNA.

Figure 1:
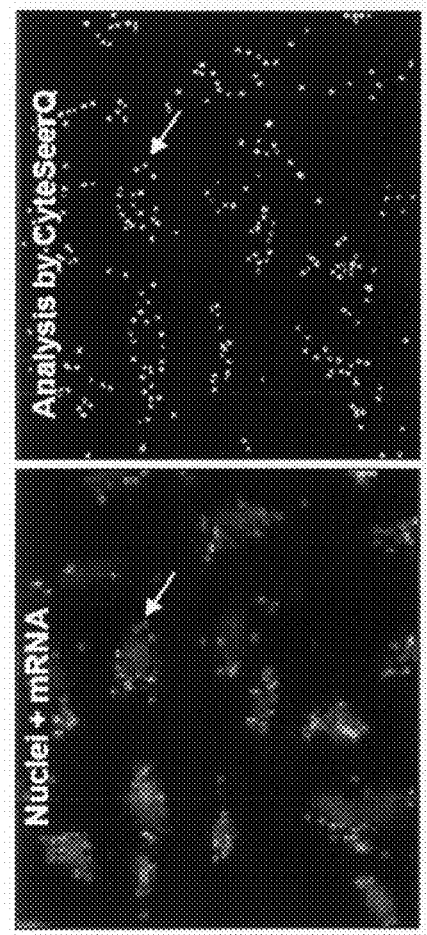
FIG. 1 illustrates how objects in cells are visualized for multiple processing channels by an automated image processing system.
Figure 2:
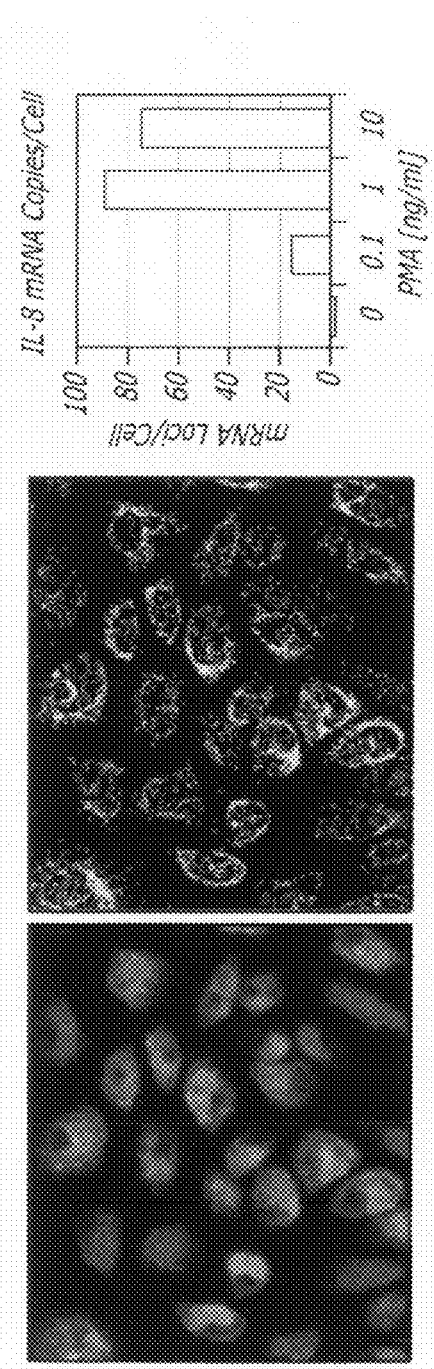
FIG. 2 illustrates quantification of induction of IL-8 messenger RNA in response to concentration of a reagent.

Visual representations of these operations are presented in FIGS. 1 and 2. However, these are only meant to illustrate how an automated image processing system operates. The panels of these figures are colored for convenience and ease of understanding. In fact, the image acquisition and processing operations of an automated image processing system are conducted on grey scale images that are acquired from stained samples via filtered imaging.

To quantify gene transcription, the mRNA loci can be individually counted for each cell. While this can be done manually, by loading such images in a general purpose image analysis program, manual analysis is very laborious and time consuming due to fatigue and inconsistency between researchers. A convenient, user-friendly, and accurate alternative may be provided by an image processing algorithm, which may be in the form of a Windows® compatible, Java-based software system, specifically engineered for this application. With reference to FIG. 1, for example, such a system identifies individual cells, and quantifies the number of mRNA loci on a per cell basis in fields of view imaged for nuclei (shown in blue with DAPI staining), and for mRNA (shown in green using fluorescent reagents). Results produced by such a system may be input into a quantitative modeling system (such as a spreadsheet process) in order to organize, quantify, model, and present the results for interpretation and analysis.

FIG. 2 illustrates the performance of an mRNA assay and quantification by an image processing algorithm in an experimental setting, using a Quantigene® reagent set available from Panomics, Inc., Fremont, Calif. and an automated image processing system available from Vala Sciences, Inc. In this assay, cells were exposed to different concentrations of phorbol 12-myristate 13-acetate (PMA), and analyzed for the copy number of IL-8 mRNA. For control cells (exposed to 0 PMA), essentially no IL-8 mRNA were detected (0.05/cell). In contrast, exposure to PMA led to a dramatic increase in the presence of the loci with an EC50 of between 0.1 and 1 ng/ml PMA. The left panel of FIG. 2 shows visualization of nuclei (blue) and mRNA (green) in cells exposed to 1 ng/ml PMA; the middle panel shows how an automated image processing system based on related U.S. patent application Ser. No. 11/285,691 identifies mRNA loci (green); and the right panel is a bar chart produced by quantitative modeling of data obtained from the images of the left and right hand panels. The right panel of FIG. 2 shows a dose-response relationship for induction of mRNA by PMA; each bar in the chart represents a mean of 67 to 100 cells.

A user interface method for management and control of automated image processing in high content screening or high throughput screening is now set forth. Although useful for a single image processing algorithm, the explanation presumes the installation and operation of an automated image processing system with a set, group, family, or library of image processing algorithms from which a user may select an algorithm for performing a specific task such as visualization and detection of mRNA loci. Such a system may be based on, for example, the system set forth in related U.S. patent application Ser. No. 11/285,691. The automated image processing system is installed on or in computer, web, network, and/or equivalent processing resources that include or execute cooperatively with other processes, including data and file management and quantitative modeling processes. The method includes some or all of the following acts.

1. Initially, an assay sample to be visualized is prepared. The sample may be, for example, cells on a tissue slide, a coverslip or in optically clear multiwall dishes.

Figure 3:
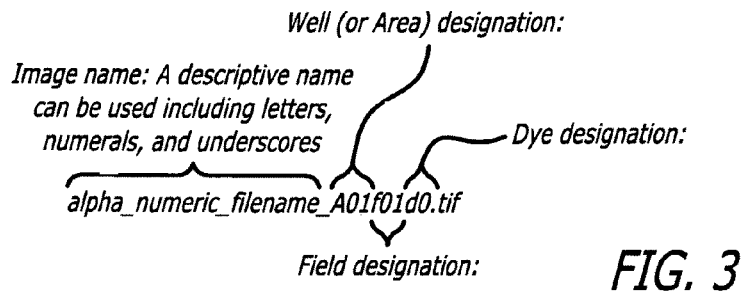
FIG. 3 illustrates an image naming convention.

2. The automated image processing system is launched and the system acquires magnified images of the sample. For the example mRNA assay described above, such images may include images represented by those of the left panels of FIGS. 1 and 2. At each image location (well or slide area) the system obtains a grey scale image of nuclei (using a blue filter if nuclei are stained with blue dye) and a grayscale image of mRNA (using a green filter if mRNA strands are colored with a green probe). As they are acquired, the images are placed in a file system storage structure, for example a folder, by the automated image processing system. Preferably, each image has a tag appended to it by the automated image processing system. The tag may be called a "name". Preferably, the automated image processing system observes and implements at least one, and preferably two or more image naming conventions. Preferably, the automated image processing system receives a command entered by the user as to which naming convention to use when acquiring images. One such naming convention is illustrated in FIG. 3. In the example of FIG. 3, the naming convention includes an alphanumeric image name followed by a designation of a well or a slide area at which the image was obtained, a field designation, and a channel designation. The field designation indicates a field of the designated well or slide area where the image was obtained. The channel designation indicates a processing channel that corresponds to some component of an object in the image. There may be one, two, or more, channels defined for a set of images obtained from an assay. Components that correspond to respective channels may include, for example cell membrane, cell nucleus, lipid droplet, mRNA strand, etc. In some instances, where the color of the component is known, the channel may be designated by the dye selected to stain the component (and thus the filter with which the component is found). Thus, with respect to the illustrative mRNA assay example, a "nuclear channel" (or a "blue" channel) may correspond to cell nuclei, and an "RNA channel" (or a "green" channel) to RNA dots.

3. When a set of magnified images has been obtained, named, and placed in a folder by the automated image processing system, an image processing algorithm is launched to obtain image data indicative of assay results from the images. The launch initially causes the graphical user interface (GUI) screen shown in FIG. 4 to be displayed. The screen enables the user to manage and control the automated image processing performed by the algorithm.

4. Using the GUI screen of FIG. 4, the user chooses an image naming convention by way of the drop-down menu entitled "Image Naming Convention".

Figure 5:
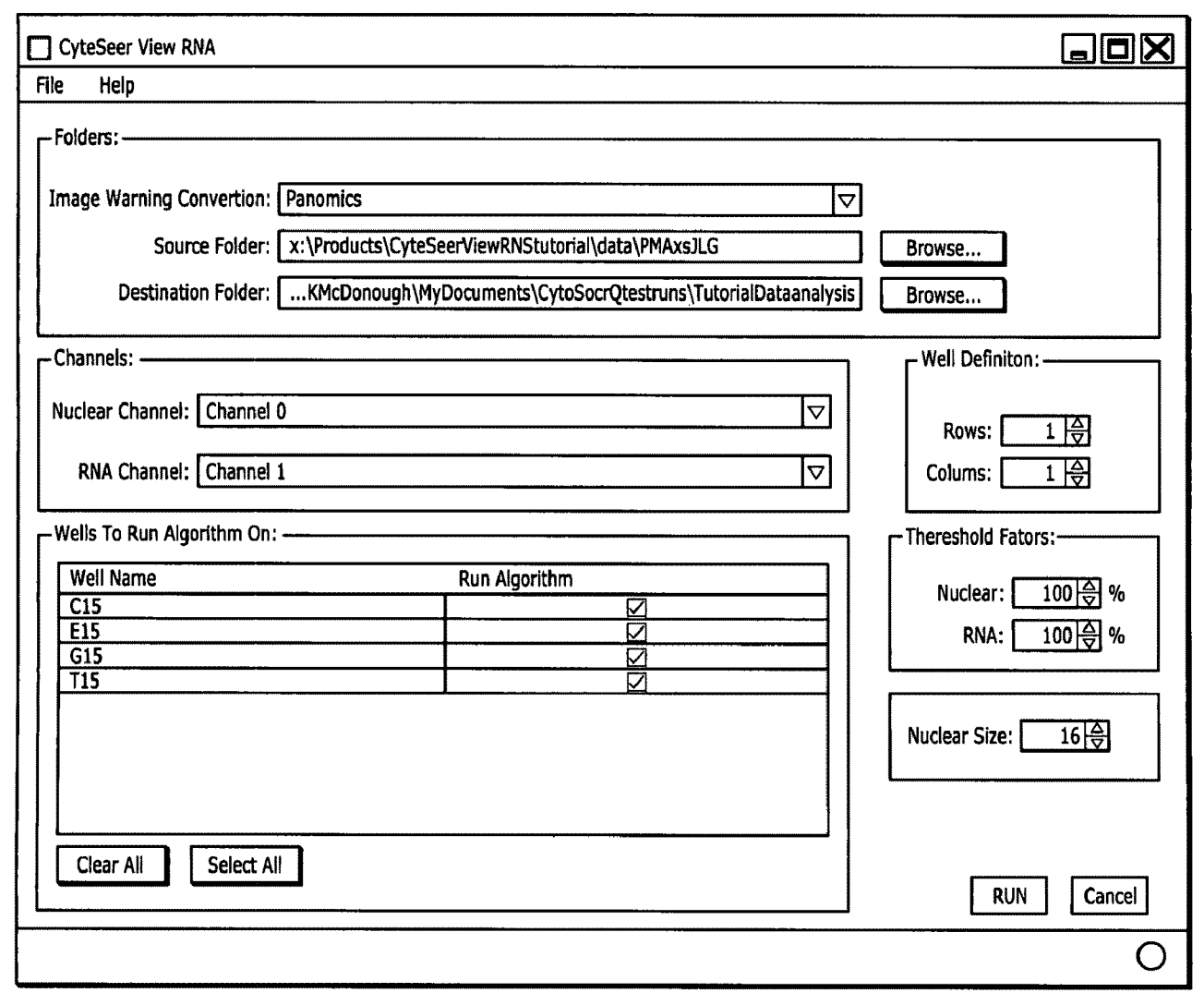

5. Using the GUI screen of FIG. 4, the user chooses a source folder containing images to be processed by way of the drop-down menu entitled "Source Folder". For convenience, the user may browse to a source folder with images containing images tagged according to the selected image naming convention by way of the browse button to the right of the "Source Folder" drop-down menu. This choice will cause the "Wells To Run Algorithm On" field to populate, displaying the well or slide area names of files. The result is shown in FIG. 5.

6. Using the GUI screen of FIG. 4, the user chooses a destination folder. Preferably, the automated image processing will generate reference "mask" images and *.csv files (Excel compatible) and place these files in the folder designated here. The destination folder may be found or created using the "Destination Folder" drop-down menu and the browse button to the right of it. The resulting choice is shown in FIG. 5.

7. Using the GUI screen of FIG. 4, the user associates image characteristics with two or more system-named channels for the automated image processing to be conducted. With the illustrated example, the user may associate a first color cannel (blue as channel 0, for example) with a nuclear channel and a second color (green as channel 1, for example) with an RNA channel. The choices designate respective nuclear and mRNA locii process streams in the image processing algorithm. The resulting choices are shown in FIG. 5.

8. Using the GUI screen of FIG. 4, the user establishes a well definition for a number of fields in a "Well Definition" control box. That is, the user indicates the number of fields to be processed in each well (or slide area). Thus, if there is one field (one image) per well, the user defines a single-field matrix on each well by setting both row and column indications to "1". If 4 images are collected per well (or area) the user may designate 1 row by 4 columns, 2 rows by 2 columns, or 4 columns by 1 row. The images are analyzed independently by the automated image processing system. The resulting choices shown in FIG. 5 imply that only one image is obtained at each well or slide area.

9. Using the GUI screen of FIG. 4, the user establishes threshold parameter values for the channels in a "Threshold Factor" control box. That is, the user indicates a level of sensitivity to be observed by the selected image processing algorithm for each channel. In the illustrated example, the thresholds for the nuclear and RNA channels are set to 100%, which may be a default setting. Generally, as the threshold decreases, the sensitivity increase and dimmer objects will be identified for inclusion in processing operations. The resulting choices are shown in FIG. 5.

10. Using the GUI screen of FIG. 4, the user establishes nuclear size parameter value for the nuclear channel in a "Nuclear Size" control box. That is, the user indicates a level of sensitivity to be observed by the selected image processing algorithm for the size of objects in the nuclear channel. The size selected depends on the cell type and magnification used in acquiring the images. The objective is to reduce instances where the selected algorithm will incorrectly separate a large object into two smaller objects. The resulting choice is shown in FIG. 5.

11. Using the GUI screen as per FIG. 5, the user selects the wells (or slide areas) whose images will be processed by the selected algorithm. That is, the GUI screen lists in the "Well Name" column all of the wells from which images have been acquired, and presents in the "Run Algorithm" column a box for each named well that the user can click to cause the algorithm to process the image or images acquired from that well.

12. Using the GUI screen as per FIG. 5, the user commands the algorithm to execute according to the entries on the screen. In response, the automated image processing system access the source folder in a predetermined sequence, subjects the acquired images in the source folder to the selected algorithm, and generates results including images or masks such as those showing the green mRNA loci in FIGS. 1 and 2. The masks or images generated are named and stored as image files in the results folder. Using loci information in the images or masks produced, the automated image processing system extracts quantitive data FIG. 6 illustrates in a general way how an image processing algorithm may operate to obtain results from images in the source folder. An example of one such algorithm designed for processing images of mRNA transcription is the CyteSeer™-ViewRNA process available from Vala Sciences, Inc. The algorithm starts with a nuclear image (such as those in the left panels of FIGS. 1 and 2), and identifies all of the nuclei within the field of view. A nuclear mask for each cell is established. The mask contains all of the pixel locations identified as nuclear for a given cell; recall that these pixels would be blue pixels according to the mRNA example discussed above. The algorithm estimates cell boundaries and then analyzes the mRNA image, and the brightest pixels, which correspond to the mRNA spots, are assigned to the mRNA mask per the left panel in FIG. 1 and the middle panel in FIG. 2. One or more sets of experimental data may then be calculated by the automated image processing system, on a per cell basis, using the result images or masks. Preferably, these experimental data are presented and arranged according to a file convention and are placed into one or more files that can be transported, loaded, or otherwise made available to a quantitative modeling system (for example, a spreadsheet process).

Using well-known Excel spread sheet processing, the mRNA assay described above, and an image processing algorithm, examples of experimental data processing, handling, and storage are now described.

File Examples: Presume that the image processing algorithm creates data files in the *.csv (comma separated value) format that can be loaded easily into the well-known Excel® spreadsheet system. A file that represents a summary for an experimental data set is created and is placed at a first level within the Destination folder. One example is the PMAvsIL8_DataTable.csv shown in the upper panel of FIG. 7. Additionally, two data files are created within a subdirectory for each selected well. The wellname_DataTable.csv file (e.g., C15_DataTable.csv in FIG. 7, lower panel) contains a cell by cell data readout for every cell analyzed for the well (or slide area). A Well_name DataTable_Stats.csv file contains summary statistics for a selected well. For example, C15_DataTable_Stats.csv in FIG. 7, lower panel, contains summary statistics for well C15, selected as described above.

Data Table Examples: The experimental data may be stored in tables, such as the tables referenced in the files described above, and may be provided therein to a quantitative modeling system for further processing. One example of a table containing experimental data for use by a spreadsheet process is seen in FIG. 8. In this example, a user would launch a spreadsheet process and use an OPEN command to open the C15_DataTable.csv file shown in FIG. 8. It may be necessary to select "All Files" in the "Files of type" field within the Open menu of the spreadsheet process to view and select csv files. In response, the spreadsheet process will automatically open a "workbook"—style interface and the spreadsheet cells will range from addresses A1 to AA178 for C15_DataTable.csv. Note that a description of the file is automatically generated and displayed in addresses A1 to B2 (e.g., Data Table: C15 Data Table. Description: Data Table for cells in well C15), and the Legend portion of the file extends from A5 to C3. A7 to A33 indicate the data type of each parameter (integer, double precision, or Boolean). B7 to B33 contain short descriptions, which are also the column headers for the data displayed in the Data Table portion of the spreadsheet (A36 to AA178 for C15_DataTable.csv). C7 to C33 contain brief descriptions of each data parameter. The "id" label (Excel address B7) is the header for column A in the Data Table; this is an integer number that is uniquely assigned to each cell in the image corresponding to well C15.

Figure 9:
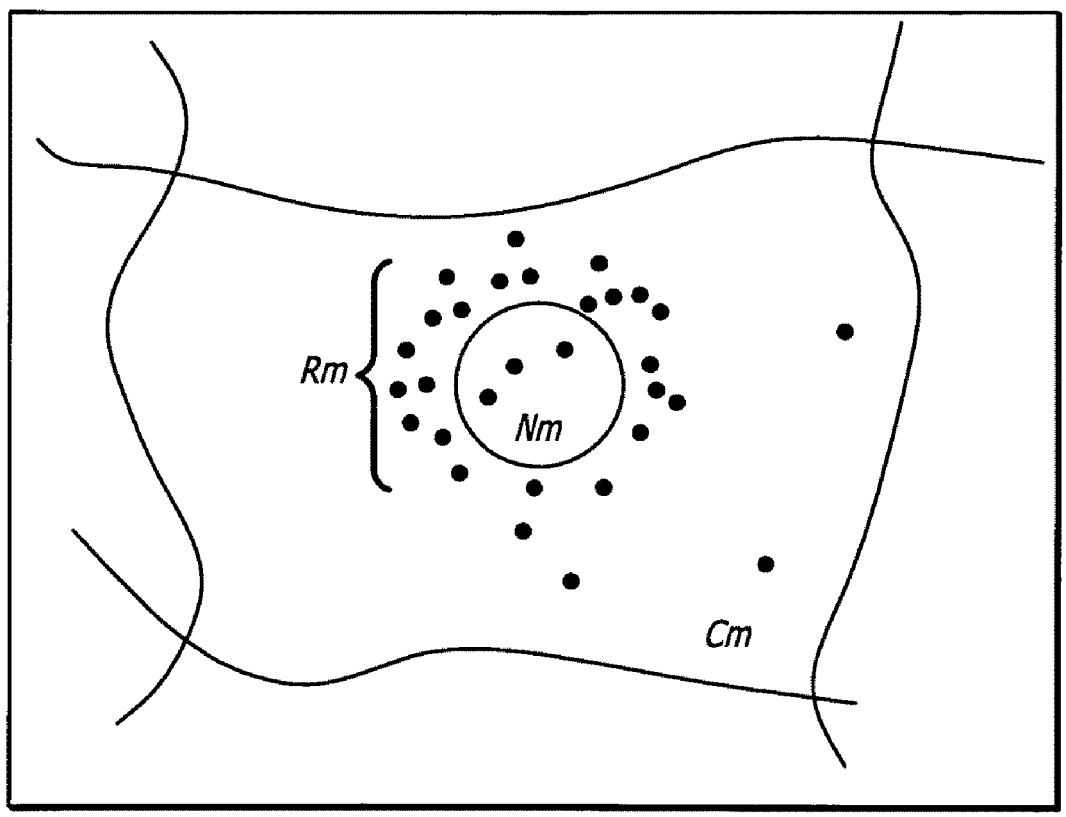
FIG. 9 illustrates an image process performed by an automated image processing system to generate quantitative data from an acquired image.

The experimental data provided to the quantitative modeling system may include quantitative data obtained from the images acquired and/or produced by the automated image processing system. For example, refer to FIG. 9, which represents a cell with mRNA according to the assay example described above. In FIG. 9, Nm is the nuclear mask and corresponds to the number of pixels that make up the nuclei. Cm is the cytoplasmic mask, which extends from the cell boundaries to the nucleus. Rm is the RNA mask and corresponds to the number of pixels found within RNA dots for the cell. The automated image processing system obtains quantitative experimental data from the acquired and/or result images, and places the data into tables such as the table shown in FIG. 8. The examples shown in this table include data obtained from nuclear and loci images discussed above. Nm, which is the size of the nucleus for in units of pixel area, is obtained from an acquired image showing cell nucleii. Area Rm (Area of the RNA mask) represents the total number of pixels identified as corresponding to RNA dots within the RNA image for each cell as per FIG. 8, and is an index of mRNA expression, and will be of considerable interest to the majority of users. Data parameters XLeft Nm, YTop Nm, Width Nm, and Height Nm refer to the x,y location of each nucleus within a nuclear image, and the width and height dimensions, which will assist a user in identifying the location of each cell within a field of view. "IsBoundaryNm" can be either True or False; cells near the boundary of the image (IsBoundaryNm=True) might extend beyond the field of view, and the analysis for RNA expression by may be incomplete. The IsBoundaryNm parameter can be used to sort the cells within the spreadsheet program, and exclude boundary cells from further analysis, if desired. XCentroid Nm and YCentroid Nm are the x and y coordinates within the image for the center of each nucleus.

Continuing with the description of the data table example of FIG. 8, RNA spot count, Mean RNA Spot Area, and RMS RNA Spot Diameter are useful data parameters relating to RNA expression. RNA spot count is the number of mRNA loci for each cell. Mean RNA Spot Area is the average size of the RNA spots for a particular cell (in units of pixel area). RMS RNA Spot Diameter is an estimate of the mean diameter of the RNA spots in the cell (RMS stands for a Root Mean Square, and refers to the method used to estimate spot diameter). Area X Nm is the area of the nucleus that is NOT also part of the RNA mask; similarly, Area X Cm is the area of the cytoplasmic mask that is NOT also part of the RNA mask. Area X Nm and Area X Cm define the size of the "background" areas within the nucleus and cytoplasm. Advanced users may find these data parameters useful, especially with comparisons to the Area Rm; for example, it might be of interest to calculate: Area Rm /(Area X Nm+Area X Cm+Area Rm), which is the ratio of the area of the RNA spots to the entire area of the cell.

In the example of FIG. 8, Total integrated intensity of the RNA image for the RNA mask is the sum of intensities of the pixels that have been assigned to the RNA mask for each cell (TII Ri Rm—line 22 and column P of the Data Table), is a useful parameter related to mRNA expression. Similarly, the average and median pixel intensities of the RNA image for the RNA mask for the cell are the API Ri Rm, and MPI Ri Rm, respectively. The Standard Deviation of Pixel Intensities for the RNA image RNA mask (SPI Ri Rm) is also reported. This parameter may be of special interest to researchers performing screens of chemical or RNAi libraries involving thousands of samples, as standard deviations of intensity can sometimes be less variable than the means or total integrated intensity measurements.

Finally, in the table of FIG. 8, a series of data parameters are reported that correspond to the background pixel intensities. These include the total integrated, average, and median pixel intensities for the RNA image for pixels within the nuclear mask that are NOT RNA spots (TII Ri X Nm, API Ri X Nm, MPI Ri X Nm, where "X" means NOT RNA spots). The same series of values are also reported for the regions of the cytoplasm that are NOT RNA spots (TII Ri X Cm, API Ri X Cm, MPI Ri X Cm). These data parameters can be used, in combination with the data parameters for the RNA spots to quantify how bright the spots are with regard to the background. For example, differences between API Ri Rm–API Ri X Cm represents the difference in intensity between the RNA spots and the background within the cytoplasmic region. Such differences may be useful parameters to monitor in a screening assay, and, also are likely to be useful for optimization of the assay conditions and imaging parameters for particular samples types.

In FIG. 10, two additional data tables useful for managing additional experimental data related to the mRNA example described above are shown. The first part of the data table portion of the C15_DataTable.csv file is shown in the upper panel of FIG. 10; the analogous portion of the G15_DataTable.csv file is shown in the lower panel. For the mRNA experiment, cells in the C15 well of the dish were not exposed to an activator of IL-8 expression. Thus, cells in C15 represent the negative control for the assay. Alternatively, cells in G15 were exposed to 1 ng/ml PMA, a phorbol ester that strongly activates IL-8 expression. For the first 10 cells analyzed for C15, no RNA spots were detected. Thus, there are "0" values in Columns C, K, L, and M, which correspond to the data parameters area of the RNA mask (Area Rm), RNA spot count, and mean RNA spot area, and RNA spot diameter, respectively. Note, also that the first two cells of C15 were boundary cells (IsBoundaryNm="True"), where as the rest of the cells were judged as being entirely contained within the image (IsBoundaryNm="False"). Data is reported on a total of 142 cells for well C15 in the C15_DataTable.csv file. In contrast, all of the first 11 cells in the G15 data table featured RNA spots (FIG. 10 lower panel). Thus, there are positive data entries for every line in columns C, K, L, and M. For G15, cell number 8 (Excel line 44), for example, featured 2106 pixels in the RNA mask (column C), an RNA spot count of 148 (column K), a mean RNA spot area of 14.23 pixels (Column L), and an average RMS spot diameter of 4.2565 pixels. Note that data is reported on a total of 136 cells for well C15 in the C15_DataTable.csv file.

Figures 2, 11:
FIG. 11 illustrates two additional data table formats used to store experimental data produced by an automated image processing system.

With reference to FIG. 11, portions of the C15_DataTable_Stats.csv (found in the C15 directory) and the PMAvsIL8_DataTable_Stats.csv files (found under the parent directory for the experimental results) are illustrated. The layout of the DataTable_Stats.csv files is related to, but somewhat different than the previously described DataTable.csv files. For example, values in column A are the StatsID numbers. There are 6 useful statistics which are the Count (Row 39 in the C15_DataTableStats.csv file) which is the number of cells that were used in the calculations, the Mean, which is the average value obtained for all cells (the well population) that were analyzed in the well, Sigma, which is the standard deviation for the data parameter and for the well population, Median, which is the value of the data parameter for which 50% of the data values for the well exceeded (and 50% were below), the Min, which is the lowest value obtained, and the Max, which is the maximum value that was obtained. Column B displays the well designation for housekeeping purposes, and Column C displays the "Count", "Mean", "Sigma", "Median", and "Max" titles. Note that all of the data that is displayed refers to values that were derived on a "per cell" basis. For well C15, 142 cells were identified and the data that is summarized in the DataTable_Stats.csv files includes data derived from all of the cells (including the boundary cells), so the count is 142 for every statistic in the report. The Mean value for the RNA Spot Count for well C15 was 0.03521 R for well C15, and a maximum of 2 spots per cell were found for the cell population. Note that the PMAvsIL8_DataTable_Stats.csv file (FIG. 11, lower portion), features the identical display for well C15, along with data obtained from all wells in the experimental analysis. Thus, this file provides a convenient reference, displaying a summary of all the results for the experiment.

Figure 12:
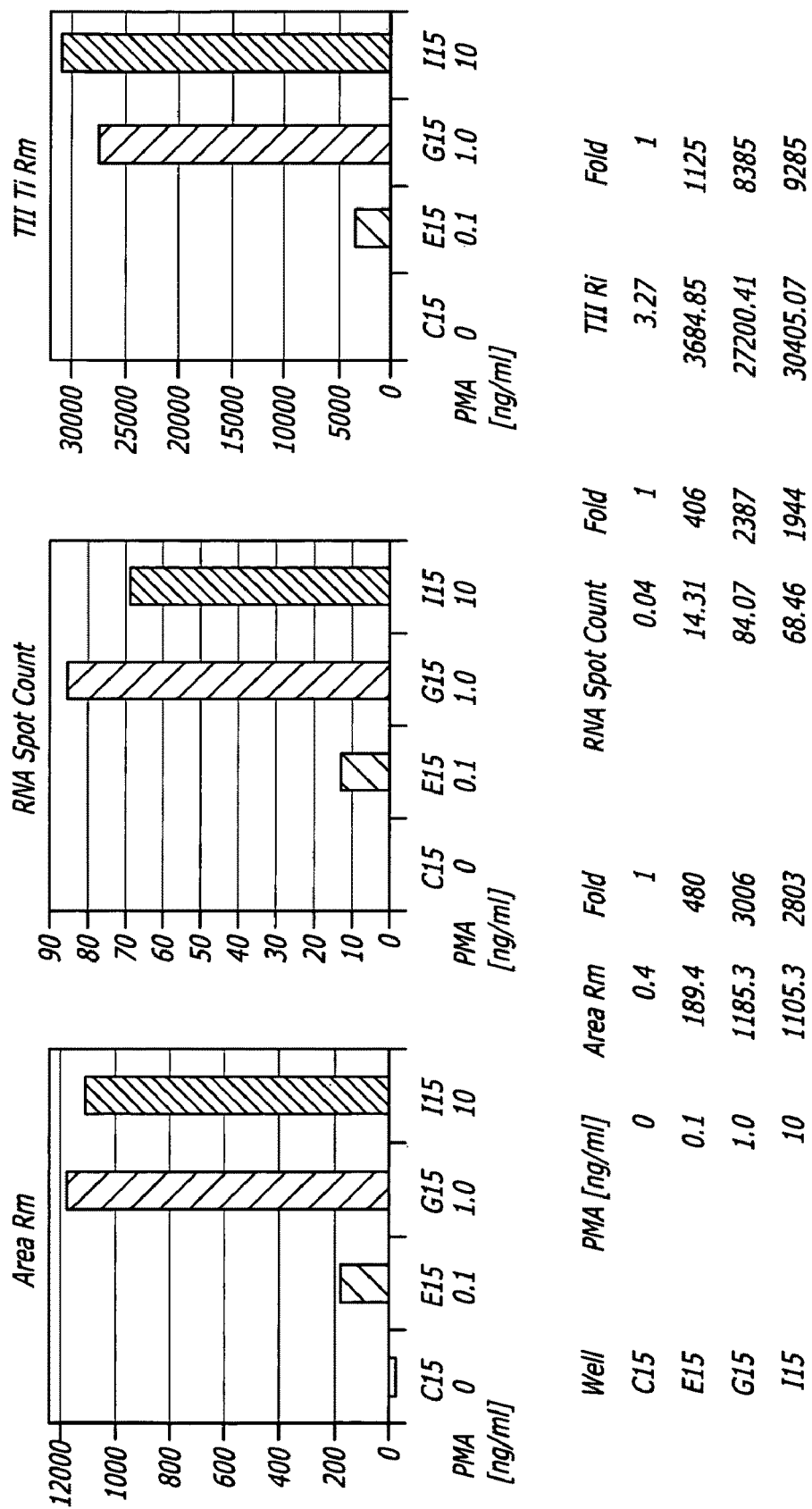
FIG. 12 illustrates modeling of experimental results.

Results for the experiment in which the effect of PMA was tested on IL8 mRNA expression are shown in FIG. 12. Results are graphed and tabulated for 3 key data parameters that describe mRNA expression. Area Rm, the average area, per cell, of the RNA mask was <1 for well C15, but >1100 for well G15. Thus, addition of 1 ng/ml PMA elicited a 3000-fold increase in this parameter. For the RNA spot count, essentially no spots were found for the control well (the average number of spots was approx. 0.04/cell), whereas 14.3 spots/cell were found for cells exposed to 0.1 ng/ml PMA (well E15), and 84.1 spots/cell were found for 1 ng/ml PMA (well G15). Also, note that the TII Ri Rm data parameter, which is the total intensity of the spots/cell, went up by 8000-fold (Table in FIG. 12). Since the assay results in a single RNA spot per mRNA, the RNA Spot Count data parameter may be of interest. Users screening large chemical or siRNA libraries vs. mRNA expression, utilizing automated methodology, may find the Area Rm and TII Ri Rm data parameters of interest, due to the very high dynamic range these parameters may provide for the assay.

Figure 4:
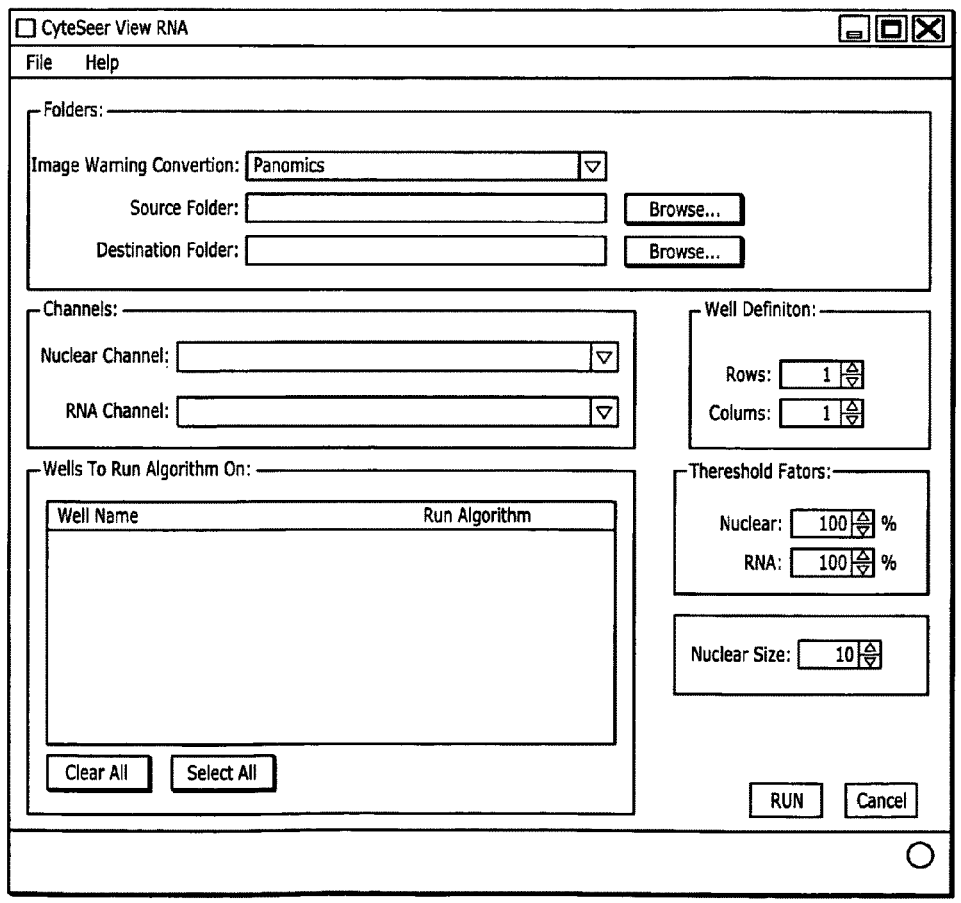
FIG. 4 illustrates a graphical user interface screen useful for management and control of automated image processing.
Figure 13:
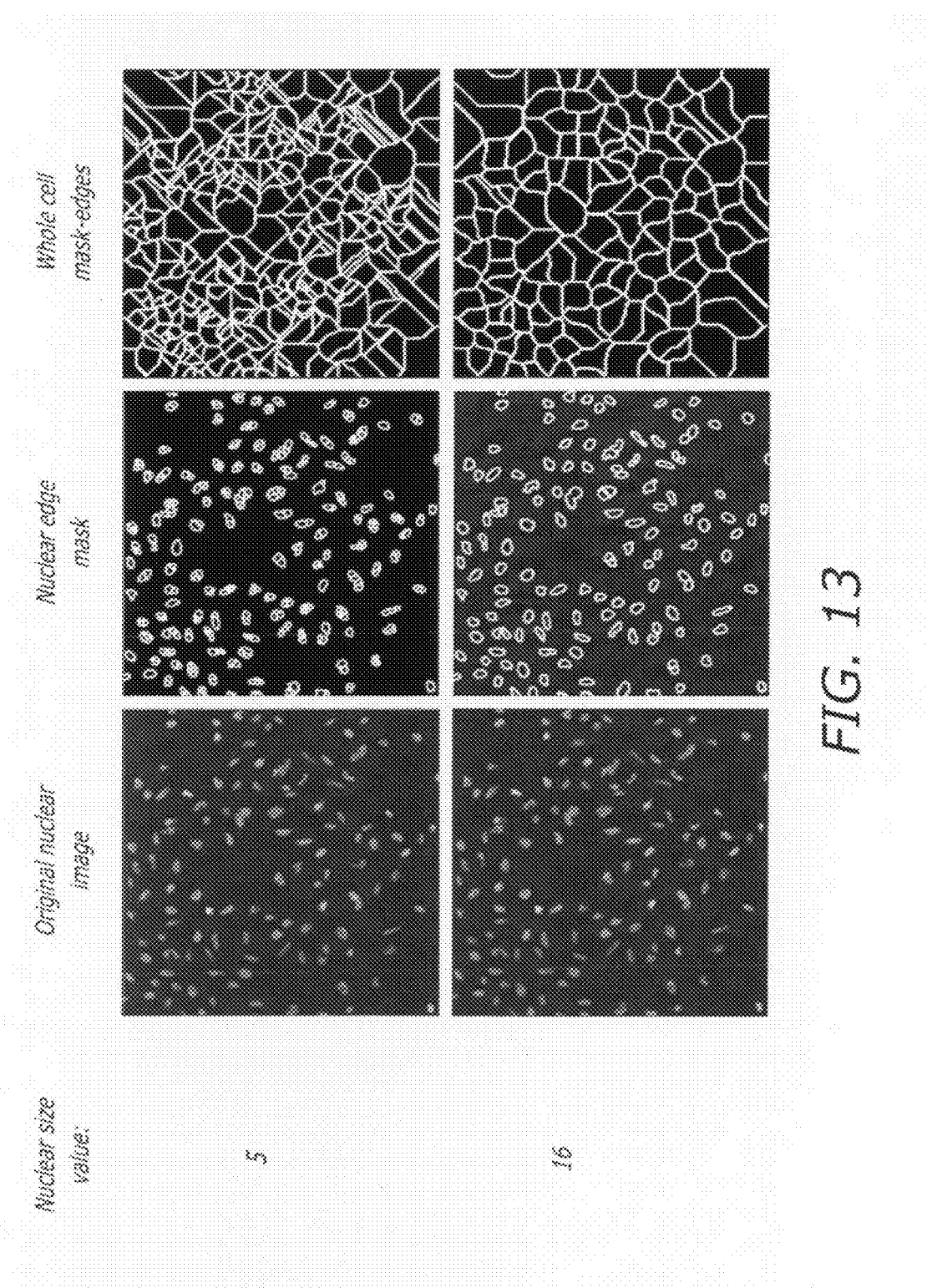
FIG. 13 shows sample images obtained through a nuclear channel of an automated image processing algorithm for different nuclear size values of the Nuclear Size setting of the graphical user interface of FIG. 4.

Setting examples: Refer now to FIG. 13 for an understanding of Nuclear Size adjustment using the GUI of FIG. 4. A default setting (Nuclear Size=10, Nuclear Threshold=100, RNA Threshold=100) are appropriate for digital microscopy workstations utilizing 20× objectives, and for images captured with typical digital cameras. While these settings are likely to be very good for most circumstances, a user may run test analyses at various settings, to further optimize the performance of the automated image processing system. To produce optimal data analysis, the automated image processing system should identify the position of each nucleus in the nuclear image for every field of view. To help the system recognize the nuclei of different cell types and at different magnifications, and different overall staining intensities, user-adjustable controls are provided on the user GUI of FIGS. 4 and 5 that are relevant to the nuclear images. These are the expected Nuclear Size, and the Nuclear Threshold settings. In the example of FIG. 4, a number between 1 and 99 can be entered into the Nuclear Size field. These numbers may not correspond to an exact physical dimension of the nucleus, but, instead may be relative. To adjust the nuclear size adjustment for improved results, a user may set the Nuclear Size to 5, with the Nuclear and RNA Thresholds set at 100%, select a well (or slide area) for analysis and run the mRNA image processing algorithm. Next, a new output folder may be created and named, and, with the Nuclear Size set to another value (for example, 16) the algorithm may be run on the same well (or slide area). Images generated by the algorithm of the same well with different Nuclear Size settings are shown side by side in FIG. 13. The Nuclear edge mask shows the boundary circles for the nuclei identified by algorithm processing. For the Nuclear Size 5 analysis, many of the original nuclei are subdivided into two or more circles in the Nuclear edge mask. Thus, Nuclear Size 5 may be too low a value for this cell type and magnification. In this regard, consider the Whole cell mask-edges generated for the size 5 setting, which displays the boundaries of the cells as estimated by the algorithm; many very small shapes are shown that may be too small to represent authentic cells and many cell boundary lines cross nuclei (some are sectioned into 2 or even 4 cells). Consider next the Nuclear edge mask and Whole cell mask-edge images for the analysis with Nuclear Size 16. The Nuclear edge mask image includes single circles at the position of nearly every authentic nuclei in the field of view (lower middle panel, FIG. 13), indicating that the algorithm performed correctly. Furthermore, the cell boundaries are appropriately sized and rarely cross nuclei. Thus, for the particular circumstances of this example, a Nuclear Size of 16 will result in accurate cell counts, and an accurate count of the number of mRNA spots per cell.

Figure 14:
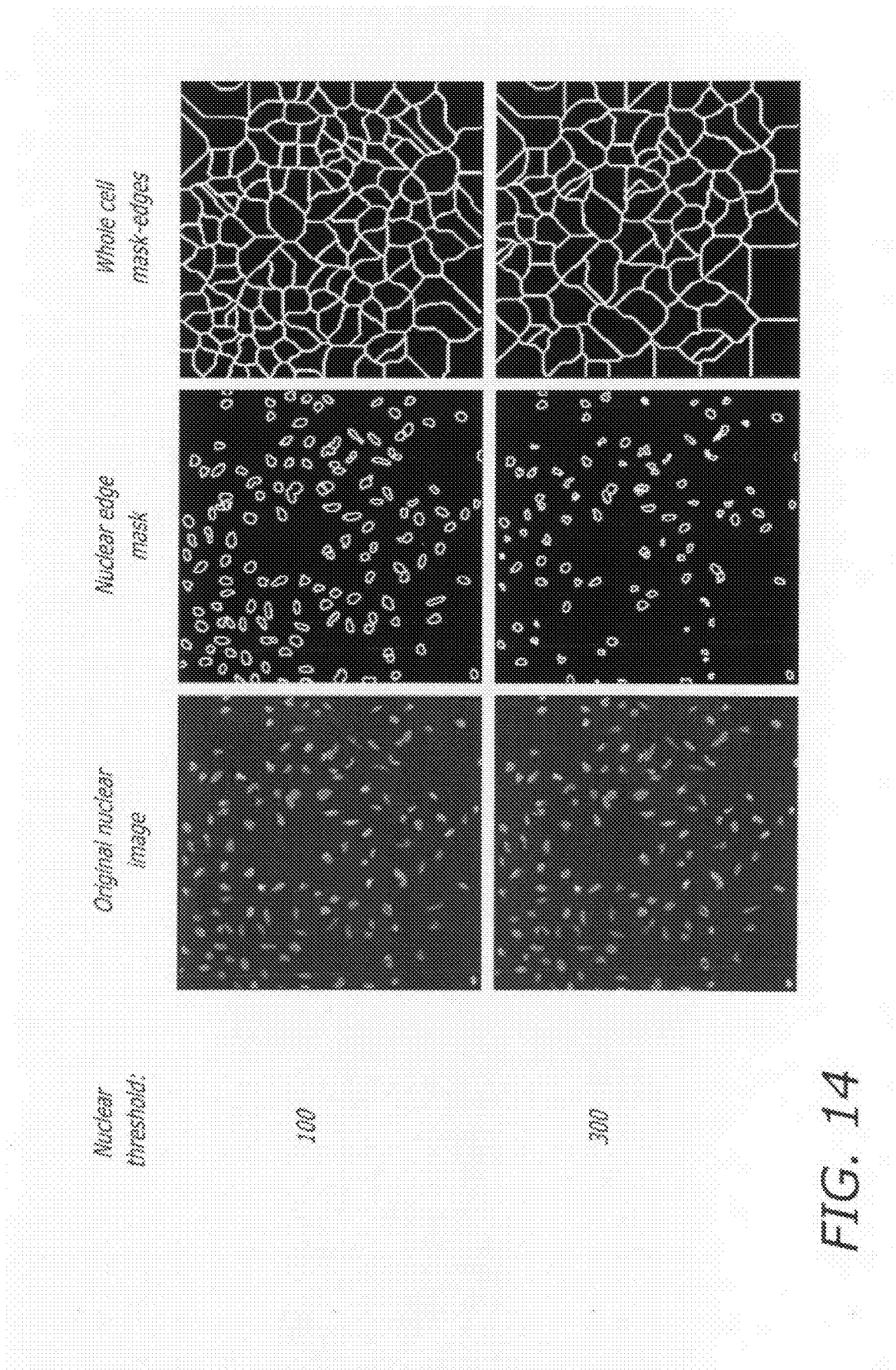
FIG. 14 shows sample images obtained through the nuclear channel for different nuclear size values of the Nuclear threshold setting of the graphical user interface of FIG. 4.

Refer now to FIG. 14 for an understanding of the Nuclear Threshold adjustment using the GUI of FIG. 4. Entry of a lower number may cause the algorithm to recognize dimmer nuclei in the nuclear channel, whereas entry of larger numbers will reduce the sensitivity of the system. To illustrate this principle, the acquired images that resulted in the images in FIG. 13 resulted in the images of FIG. 14, with the Nuclear Size set to 16, RNA Threshold to 100, with Nuclear Threshold settings of 100 and 300. The results indicate that a setting of 300 resulted in many nucleii being missed, indicating greater algorithm accuracy with the lower setting of 100.

The GUI of FIG. 4 also provides an RNA Threshold adjustment. The ability of the mRNA algorithm to analyze the RNA image may be adjusted by use of the RNA Threshold feature.

With reference to the middle panel in FIG. 2, the smaller the number entered for this parameter, the more spots will be counted by the program. However, the smaller the number that is entered, the greater the risk of also quantifying small image artifacts as authentic RNA spots. Adjustment of the RNA threshold setting may cause the mRNA algorithm to match what a user may see when looking through a microscope, and using any image enhancement tools at hand. Another approach that may be preferred when performing screening assays may be to select RNA threshold parameters that yield the greatest separation between certain experimental conditions. For example, reducing the RNA channel sensitivity (by using a higher RNA threshold number), might diminish the number of "false positives" in a large screen.

INDUSTRIAL APPLICATION

A method and system for controlling automated image processing, image data management, and image data analysis operations of HCS and/or HTS systems according to the Detailed Description include a graphical user interface ("GUI") to enable user designation of an image naming convention, image sources and destinations, image processing channels, processing parameter values, and processing spatial designations may be implemented in a software program, for example, a program written in the C++ and/or Java programming languages, and a counterpart system may be a general purpose computer system programmed to execute the method. Of course, the method and the programmed computer system may also be embodied in a special purpose processor provided as a set of one or more chips. Further, there may be a program product constituted of a program of computer or software instructions or steps stored on a tangible article of manufacture that causes a computer to execute the method. The tangible article of manufacture may be constituted of one or more real and/or virtual data storage articles.

Figure 15:
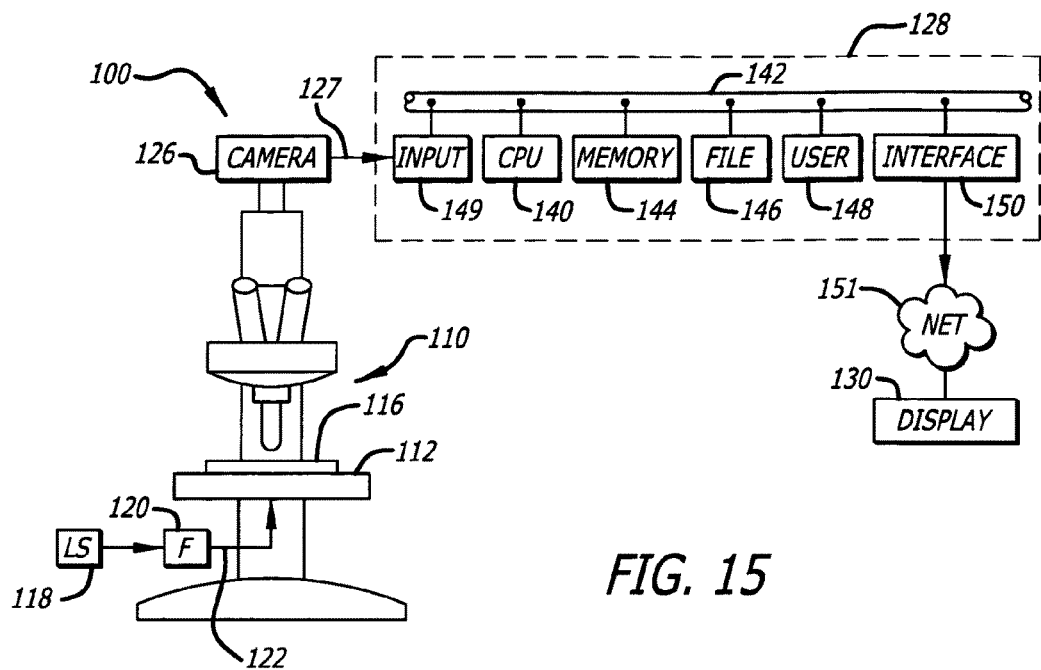
FIG. 15 is a block diagram of an automated system for obtaining and processing images of biological material to identify components in a biological object in the image.

FIG. 15, which is meant for example and not for limitation, illustrates an automated instrumentation system with provision for controlling automated image processing, image data management, and image data analysis operations of HCS and/or HTS systems by way of a graphical user interface ("GUI") that enables user designation of an image naming convention, image sources and destinations, image processing channels, processing parameter values, and processing spatial designations. For example, the instrumentation system may be, or may reside in, or may be associated with a microscopy system 100 including a microscope 110 with a motorized, automatically moveable stage 112 on which a carrier 116 of biological material may be disposed for observation by way of the microscope 110. The carrier 116 may be a multi-well plate having a plurality of containers called wells disposed in a two dimensional array. For example, and without limitation, the carrier 116 may be a ninety-six well microtiter plate in each well of which there is biological material that has been cultured, activated, fixed, and stained. A light source 118 provides illumination for operation of the microscope 110 by way of an optical filter 120 and a fiber optic cable 122. The moveable stage 112 may be stationary to obtain a single image, or it may be intermittently or continuously moved to enable the acquisition of a sequence of images. Images observed by the microscope 110 are directed by mirrors and lenses to a high-resolution digital camera 126. The camera 126 obtains and buffers a digital picture of a single image, or obtains and buffers a sequence of digital pictures of a sequence of images. A digital image or a sequence of digital images is transferred from the camera 126 on an interface 127 to a processor 128. The interface 127 may be, for example and without limitation, a universal serial bus (USB). Digital images may be in some standard format that is received as, or converted into, original, magnified images, each composed of an N×M array of pixels by the processor 128. The processor 128 receives one or more original, magnified digital images of biological material and stores the images in image files. The original digital images are processed by the processor 128 and output digital images are provided by the processor 128 for display on an output device with a display 130.

With further reference to FIG. 15, the processor 128 may be a programmed general purpose digital processor having a standard architecture, such as a computer work station. The processor 128 includes a processing unit (CPU) 140 that communicates with a number of peripheral devices by way of a bus subsystem 142. The peripheral devices include a memory subsystem (MEMORY) 144, a file storage subsystem (FILE) 146, user interlace devices (USER) 148, an input device (INPUT) 149, and an interface device (INTERFACE) 150. It is not necessary that the processor 28 be connected directly to the microscope 110; it may receive magnified images produced by the microscope from a portable storage device, or by way of a local or wide area network. For example, magnified images obtained by a microscope may be transported to the processor over the internet.

The bus subsystem 142 includes media, devices, ports, protocols, and procedures that enable the processing unit 140 and the peripheral devices 144, 146, 148, 149, and 150 to communicate and transfer data. The bus subsystem 142 provides generally for the processing unit and peripherals to be collocated or dispersed The memory subsystem 144 includes read-only memory (ROM) for storage of one or more programs of instructions that implement a number of functions and processes. One of the programs is an automated image process for processing a magnified image of biological material to identify one or more components of an image. The memory subsystem 144 also includes random access memory (RAM) for storing instructions and results during process execution. The RAM is used by the automated image process for storage of images generated as the process executes. The file storage subsystem 146 provides non-volatile storage for program, data, and image files and may include any one or more of a hard drive, floppy drive, CD-ROM, and equivalent devices The user interface devices 148 include interface programs and input and output devices supporting a graphical user interface (GUI) for entry of data and commands, initiation and termination of processes and routines and for output of prompts, requests, screens, menus, data, images, and results.

The input device 149 enables the processor 128 to receive digital images directly from the camera 126, or from another source such as a portable storage device, or by way of a local or wide area network. The interlace device 150 enables the processor 128 to connect to and communicate with other local or remote processors, computers, servers, clients, nodes and networks. For example, the interface device 150 may provide access to an output device 130 by way of a local or global network 151.

Figure 16:
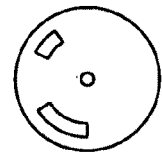
FIG. 16 illustrates a tangible medium of storage to store a set of software instructions that enable an automated image screening system to operate according to a method.

Methods and apparatuses for practicing the teachings of this specification may be constituted in whole or in part of a program product with a computer-readable storage medium, network, and/or node that enables a computer, a processor, a fixed or scalable set of resources, a network service, or any equivalent programmable real and/or virtual entity to execute a GUI and/or perform image processing as described and illustrated below. The program product may include a portable medium suitable for temporarily or permanently storing a program of software instructions that may be read, compiled and executed by a computer, a processor, or any equivalent article. For example, the program product may include a programmed CD such as is seen in FIG. 16, or a network-accessible site, node, center, or any equivalent article.

The invention claimed is:

1. A user interface method for controlling automated processing of images acquired from a sample of biological material, including processor-executed steps comprising:
  displaying a graphical user interface;
  receiving via the graphical user interface a designation of image sources;
  receiving via the graphical user interface a designation of first and second image processing channels, each image processing channel corresponding to a respective image component;
  receiving via the graphical user interface settings of a parameter value for an image component; and,
  displaying mask images generated according to the settings by an automated image process from an image stored at an image source;
  the mask images including a first mask image with masks representing a first count of positions of the first component in the image according to a first setting and a second mask image with masks representing a second count of positions of the first component in the image according to a second setting;
  wherein the first and second counts are unequal.

2. The user interface method of claim 1, wherein the image component is a cell nucleus and the parameter value is a nuclear size.

3. The user interface method of claim 2, wherein displaying mask images includes displaying images with masks representing nuclear edges.

4. The user interface method of claim 1, wherein the image component is a cell nucleus and the parameter value is a nuclear size threshold.

5. The user interface method of claim 4, wherein displaying mask images includes displaying images with masks representing nuclear edges.

6. The user interface method of claim 1, wherein the image component is a cellular component and the parameter value is a threshold value indicating a level of sensitivity to be observed by the automated image process for an image processing channel.

7. The user interface method of claim 6, wherein the cellular component is a nucleus.

8. The user interface method of claim 6, wherein the cellular component is RNA.

9. A user interface method for controlling automated processing of images acquired from a sample of biological material, including processor-executed steps comprising:
  displaying a graphical user interface;
  receiving via the graphical user interface a designation of image sources and destinations;
  receiving via the graphical user interface a designation of at least one image processing channel corresponding to a respective image component;
  storing at the designated image destinations mask images generated from by an automated image process from images stored at the designated image sources;
  displaying mask images stored at an image destination; and,
  the mask images including a first mask image with masks representing a first size of the first component in the image and a second mask image with masks representing a second size of the first component in the image;
  wherein the first and second sizes are unequal.

10. The user interface method of claim 9, wherein receiving designation of at least one image processing channel includes receiving designation of a first dye.

11. The user interface method of claim 10, wherein the first dye is a nuclear stain.

12. The user interface method of claim 10, wherein the first dye is an RNA stain.

13. The user interface method of claim 9, wherein receiving designation of at least one first image processing channel includes receiving designation of a first dye corresponding to a first image processing channel and a second dye corresponding to a second image processing channel.

14. The user interface method of claim 13, wherein the first dye is a nuclear stain.

15. The user interface method of claim 14, wherein the second dye is an RNA stain.

16. The user interface method of claim 13, wherein the first component is a cell nucleus.

* * * * *